US010968540B2

(12) United States Patent
Garoff et al.

(10) Patent No.: US 10,968,540 B2
(45) Date of Patent: Apr. 6, 2021

(54) PROCESS FOR THE MANUFACTURE OF A SHAPED BODY

(71) Applicant: Stora Enso OYJ, Helsinki (FI)

(72) Inventors: Niklas Garoff, Skarholmen (SE); Robert Protz, Potsdam (DE); Jens Erdmann, Berlin (DE); Johannes Ganster, Potsdam (DE); Andre Lehmann, Potsdam (DE)

(73) Assignee: Stora Enso OYJ, Helsinki (FI)

( * ) Notice: Subject to any disclaimer, the term of this patent is extended or adjusted under 35 U.S.C. 154(b) by 383 days.

(21) Appl. No.: 15/766,470

(22) PCT Filed: Oct. 6, 2016

(86) PCT No.: PCT/IB2016/055988
§ 371 (c)(1),
(2) Date: Apr. 6, 2018

(87) PCT Pub. No.: WO2017/060847
PCT Pub. Date: Apr. 13, 2017

(65) Prior Publication Data
US 2018/0305844 A1 Oct. 25, 2018

(30) Foreign Application Priority Data
Oct. 8, 2015 (SE) .................. 1551298-1

(51) Int. Cl.
D01F 9/17 (2006.01)
D01D 5/06 (2006.01)
D01F 2/02 (2006.01)
C08L 97/00 (2006.01)
D01F 9/16 (2006.01)
D01F 9/00 (2006.01)
C08L 1/02 (2006.01)

(52) U.S. Cl.
CPC .................. D01F 9/17 (2013.01); C08L 1/02 (2013.01); C08L 97/00 (2013.01); C08L 97/005 (2013.01); D01D 5/06 (2013.01); D01F 2/02 (2013.01); D01F 9/00 (2013.01); D01F 9/16 (2013.01); C08L 2203/12 (2013.01); D10B 2201/00 (2013.01)

(58) Field of Classification Search
CPC ..................................................... D01F 9/17
See application file for complete search history.

(56) References Cited

U.S. PATENT DOCUMENTS

| 4,215,212 | A | 7/1980 | Franks |
| 4,391,670 | A | 7/1983 | Phillips |
| 9,133,568 | B2 | 9/2015 | Bissett et al. |
| 9,631,298 | B2 | 4/2017 | Lehmann |
| 2003/0188840 | A1 | 10/2003 | Van Handel et al. |
| 2014/0353861 | A1 | 12/2014 | Sjholm et al. |
| 2015/0037241 | A1 | 2/2015 | Lehmann et al. |
| 2015/0099867 | A1 | 4/2015 | Brizius |
| 2019/0032250 | A1 | 1/2019 | Ganster et al. |

FOREIGN PATENT DOCUMENTS

| CN | 103080390 A | 5/2013 |
| CN | 104945573 A | 9/2015 |
| CN | 105040146 | 11/2015 |
| JP | H05171519 A | 7/1993 |
| JP | 2006183173 A | 7/2006 |
| JP | 2008308776 A | 12/2008 |
| JP | 2015067910 A | 4/2015 |
| RU | 2045272 C1 | 10/1995 |
| RU | 2045472 C1 | 10/1995 |
| WO | 2006120235 | 11/2006 |
| WO | 2012156441 A1 | 11/2012 |
| WO | 2015143497 A1 | 10/2015 |

OTHER PUBLICATIONS

JP App. No. 2018-517772: Office Action with translation dated Jul. 14, 2020, 8 pages.
TW App. No. 105132610; Office Action with translation dated Mar. 26, 2020, 23 pages.
CN App. No. 201680058878.8; Translated Office Action dated Jul. 7, 2020, 15 pages.
Processing Principles of Polymer Materials, Edited by Xinyuan Shen, the third edition, Beijing: China Textile & Apparel Press, Dec. 2014.
Diagram of Fiber Materials, Edited by Dasheng Zhang, Jingyi Zhou—Beijing: China Textile & Apparel Press, Aug. 2015.
Study on recovery of cellulose in alkali pulp liquor by calcium chloride precipitation method, Binglin YE, Guangzhou Chemical Industry, No. 3, pp. 5-8, 1989.
Wang, Meng, "Notification of the First Office Action", Chinese Patent Application 201680058878.8, dated Oct. 29, 2019, 18 pages.
Dave, V. et al. "Cellulose-based fibres from liquid crystalline solutions: 5. Processing and morphology of CAB blends with lignin", Polymer, 1997, vol. 38, No. 9, pp. 2121-2126.
Schreiber, M. et al. "Iodine Treatment of Lignin-Cellulose Acetate Electrospun Fibers: Enhancement of Green Fiber Carbonization", ACS Sustainable Chemistry Engineering, 2015, vol. 3, pp. 33-41.
Ago, M. et al. "Thermomechanical Properties of Lignin-Based Electrospun Nanofibers and Films Reinforced with Cellulose Nanocrystals: A Dynamic Mechanical and Nanoindentation Study", Appl. Mater. Interfaces, 2013, vol. 5, pp. 11768-11776.

(Continued)

Primary Examiner — Larry W Thrower
(74) Attorney, Agent, or Firm — Greer, Burns & Crain, Ltd.

(57) ABSTRACT

The present invention relates to a method for manufacturing a shaped body comprising lignin which may be further processed into intermediate carbon fibers and finally also carbon fibers. Uses of said fibers are also disclosed. The present invention addresses the problem of lignin leaching into a precipitation bath. The solution to this problem is a novel method for minimizing the loss of lignin through the addition of certain salts into the precipitation bath.

29 Claims, No Drawings

(56) References Cited

OTHER PUBLICATIONS

Ago, M. et al. "Lignin-Based Electrospun Nanofibers Reinforces with Cellulose Nanocrystals", Biomacromolecules, 2012, No. 13, pp. 918-926.
International Search Report for PCT/IB2016/055988, dated Dec. 29, 2016.
U.S. Appl. No. 15/766,457 entitled "A Process for the Manufacture of a Precursor Yarn", Inventor: Garoff, Niklas et al., filed Apr. 6, 2018.

PROCESS FOR THE MANUFACTURE OF A SHAPED BODY

This application is a U.S. National Stage under 35 U.S.C. § 371 of International Application No. PCT/IB2016/055988, filed Oct. 6, 2016, which claims priority to Swedish Patent Application No. 1551298-1, filed Oct. 8, 2015

FIELD OF INVENTION

The present invention relates to a manufacturing process, preferably solvent-borne, for the manufacture of lignin shaped bodies comprising lignin such as endless filament yarns, non-woven fabrics, films and membranes. Said process may be continuous. The present invention addresses the problem of lignin leaching into the precipitation bath. The solution to this problem is a novel method for minimizing the loss of lignin through the addition of certain salts into the precipitation bath. The present invention also relates to a method for manufacturing of carbon fibre and uses thereof.

BACKGROUND

Lignin is a polyaromatic polyol and constitutes, after cellulose, the second largest material component in wood and other lignocellulosic plants. During chemical pulping cellulosic fibers are separated from softwoods, hardwoods, and annual plant biomass, for further processing to paper, board and tissue products. Kraft pulping is the dominant chemical pulping process. Other processes include soda pulping, sulfite pulping and the organosolv process. In alkaline pulping (i.e. kraft and soda pulping), large quantities of lignin become dissolved in the alkaline pulping liquor, known as black liquor, a highly alkaline complex mixture containing used cooking chemicals, solubilized wood lignin, carbohydrates and organic acids. From there the lignin may be further processed to energy by combustion of the partly evaporated black liquor or, alternatively, be isolated in solid form by addition of acid. The amount of carbon in lignin is approx. 60-65%. The chemical structure of precipitated lignin is determined by the type of biomass used and the pulping method.

Compared to the traditional raw materials for making fibers, non-woven fabrics and films, lignin is more cost-competitive. However, in practice, it is not a fiber- or film forming material in its unmodified form. Regarding the conversion of lignin to a shaped body most attempts described in the literature refer to melt-spinning of lignin to filament. J. F. Kadla et al. [1] describe the production of lignin fiber by melt-spinning of a commercially available kraft lignin and also melt-spinning of a mixture of lignin with low proportions up to 5% of polyethylene oxide (PEO). Processing of pure lignin requires a thermal pretreatment which increases the raw material costs and, in mixtures, only small proportions of PEO are possible since, with larger quantities of PEO, filament stickiness occurs in the stabilizing process. The carbon fibers made from the melt-spun lignin-containing precursors had strengths of approx. 0.4 GPa and moduli in the range 40-50 GPa, i.e. far below the values of commercial carbon fiber and even lower than the values of glass fiber.

Kubo et al. [2] describe a process for the melt-spinning of lignin, in which, in a pretreatment step, the non-melting high-molecular components are removed from the lignin. In a further publication, K. Sudo et al. [3] describe the pretreatment of lignin with organic solvents with subsequent melt-spinning of the chloroform-soluble fraction. The carbon fibers produced therefrom had merely a low strength level.

DE 2118488 describes a method for melt spinning a lignin derivative to lignin fiber. U.S. Pat. No. 7,678,358 claims acetylation of lignin as precursor of lignin melt-spinning without however giving any information relating to the properties of the carbon fibers produced in this way.

It has been shown that it is possible in principle to produce melt-spun lignin-containing filaments for subsequent conversion to carbonized fibers. However, a disadvantage with melt-spun lignin fibers is their low strength and brittleness. Strength levels of merely 30 to 35 MPa at 0.5 to 1% elongations at break are reported [4]. Lignin fibers cannot withstand the mechanical stresses during continuous production caused by fiber transportation (via rollers), stretching and winding/unwinding. These low strength levels make it challenging to convert the lignin precursor to carbon fiber in an industrial continuous manufacturing process which decreases the attractiveness of lignin-based precursor fibers for the production of carbon fiber. The low strength levels can be explained by the lack of a strong linear polymer backbone in the chemical structure of the lignin macromolecule.

Solvent-borne spinning processes of lignin-containing fibers also comprise a fiber-forming polymer in the dope, which gives higher fiber strength. In U.S. Pat. No. 3,461,082 methods are disclosed for dry spinning lignin to fibers. Furthermore, methods are disclosed for wet-spinning hybrid fibers from lignin dissolved in sodium hydroxide and cellulose dissolved in carbon disulfide. In addition, U.S. Pat. No. 3,461,082 describes a method for wet-spinning hybrid fibers comprised of lignin and polyacrylic nitrile dissolved in dimethyl sulfoxide. WO 2012003070 describes a method for the manufacture of dopes containing PAN and lignin for the production of carbon fiber precursors via solvent spinning. PCT/EP2012/59114 describes a method for manufacturing filaments from dopes of PAN and lignin and dopes of cellulose or cellulose derivatives and lignin, respectively, via air-gap spinning.

Solvent-borne manufacturing processes are based on dissolving the raw materials in a solvent to form the so called dope. Endless filament yarns or non-woven fabrics can be produced via solvent spinning. Films and membranes can be produced via solution casting. Solvent-borne processes for the manufacture of said lignin-containing shaped bodies require a precipitation step. After extrusion, i.e. transfiguration of the dope to a shaped body such as a filament yarn or film, respectively, the substrate is passed into a precipitation bath containing an anti-solvent, in which the shaped body is allowed to solidify through a diffusion-controlled process. The solvent diffuses from the shaped body into the precipitation bath and the anti-solvent diffuses from the bath into the shaped body, as described in PCT/EP2012/59114. When lignin is used as a raw material it has been observed that lignin leaches out from the substrate into the precipitation bath so that up to 50% of the lignin from the dope is lost. The leaching of lignin must be minimized for process cost optimization.

In solvent spinning of dopes containing polyacrylic nitrile (PAN) and lignin for the production of carbon fiber precursors it has been reported that above a certain concentration of lignin in the dope the lignin starts to leach out during the spinning process causing the formation of macro voids in the precursor which leads to poor mechanical performance of the corresponding carbon fiber [5]. In this case, the leaching of lignin is a disadvantage to both process cost and product performance.

Thus, the problem to be solved is to minimize the leaching of lignin into the precipitation bath in solvent-borne extrusion processes that are aimed at converting lignin to shaped bodies such as filaments, non-woven fabrics or films.

It has now surprisingly been found that certain salts may be helpful in this context. The solution to this problem is a method for minimizing the loss of lignin in the precipitation bath through the addition of certain salts into the regeneration medium according to the first aspect of the invention. No statements are made in the literature regarding salt addition to the precipitation bath to take influence on the loss of lignin during the precipitation step.

This invention provides a solution that alleviates or minimizes the problem of lignin leaching into the precipitation bath. The solution to this problem is as said a method for minimizing the loss of lignin through the addition of certain salts into the precipitation bath.

SUMMARY OF INVENTION

The present invention thus solves one or more of the above problems, by providing according to a first aspect a method for manufacturing a shaped body comprising lignin, comprising the following steps:
  a) providing cellulose and/or a cellulose derivative,
  b) providing lignin and/or a lignin derivative,
  c) dissolution of said components followed by subsequent mixing thus providing a dope,
  d) performing a shaping of the dope to a precursor material,
  e) performing a coagulation of said precursor material in a bath containing a coagulation liquid, wherein the coagulation liquid comprises one or more salts, and
  f) drying of said precursor material, thus providing a shaped body comprising lignin.

Also provided according to a second aspect of the invention is use of a salt for minimizing lignin loss in the manufacturing of a shaped body comprising lignin, preferably in the form of a filament yarn.

Also provided according to a third aspect of the invention is a shaped body comprising lignin obtainable by the method according to the first aspect. Preferably said shaped body is in the form of a filament, non-woven fabric film or a membrane, most preferred a filament, especially preferred a filament yarn.

Also provided according to a fourth aspect of the invention is a method for manufacturing a stabilized carbon fibre comprising the following steps:
  g) providing a shaped body comprising lignin according to third aspect, and
  h) performing a stabilization, thus providing a stabilized carbon fibre.

Also provided according to a fifth aspect of the invention is a stabilized carbon fibre obtainable by the method according to the fourth aspect.

Also provided according to a sixth aspect is a method according to the fifth aspect comprising the following additional step:
  i) performing a stretch-pre-carbonization, thus providing an intermediate carbon fiber which preferably is highly oriented.

Also provided according to a seventh aspect is an intermediate carbon fiber obtainable by the method according to the sixth aspect.

Also provided according to an eighth aspect is a method for manufacturing a carbon fiber comprising the following steps:
  j) providing a stabilized carbon fibre according to the fifth aspect or an intermediate carbon fiber according to the seventh aspect and
  k) performing a carbonization step, thus providing a carbon fiber.

Also provided according to a ninth aspect is a carbon fibre obtainable by the method according to the eighth aspect Also provided according to a tenth aspect is use of the carbon fiber according to the ninth aspect in the manufacture of carbon fiber-reinforced composites for applications such as appliances, automotive parts, wind turbine rotor blades or airplane parts.

DETAILED DESCRIPTION OF THE INVENTION

It is intended throughout the present description that the expression "lignin" embraces any lignin which may be used for making a carbon fiber or precursors thereof. Examples on said lignin are, but are not limited to softwood lignin, hardwood lignin, lignin from one-year plants or lignins obtained through different pulping methods such as, organosolv pulping or kraft pulping. The lignin may e.g. be isolated by using the process disclosed in EP 1794363. The lignin may have its origin in any biomass feedstock. The feedstock may e.g. be bagasse, as well as eucalyptus and pine. The lignin may also be of high purity: ash <1000 ppm, carbohydrate <1000 ppm, very low sulfur, low volatiles and low on particles. The lignin may also be obtained through a process of Virdia as e.g. set out in WO2014179777.

The term "lignin" also encompasses native lignin in biomass and isolated lignins. The lignin may also be a lignin derivative.

It is intended throughout the present description that the expression "cellulose" embraces any type of cellulose, such as cellulose fibers and cellulose materials. The cellulose may also be a microfibrillated cellulose (MFC). The cellulose may be bleached or unbleached. The cellulose may also be crystalline cellulose, MCC (microcrystalline cellulose); it may have a high purity due to its potential use in pharmaceutical compositions or other medical uses. The cellulose may be bacterial nanocellulose (BNC) or nanocrystalline cellulose (NCC); it may be used in electrical applications and have magnetical properties. The cellulose may be man-made synthetic polymer fibers and fibers made from dissolving pulp. The cellulose may have its origin from of a pulp, which may be chemical pulp, mechanical pulp, thermomechanical pulp or chemi(thermo)mechanical pulp (CMP or CTMP). The pulp may consist of pulp from hardwood, softwood or both types. The pulp may e.g. contain a mixture of pine and spruce or a mixture of birch and spruce. The chemical pulps that may be used in the present invention include all types of chemical wood-based pulps, such as bleached, half-bleached and unbleached sulphite, kraft and soda pulps, and mixtures of these. The pulp may be a dissolving pulp. The pulp may also comprise textile fibers. The pulp may also be based on one-year plants (e.g. bagasse, bamboo, switchgrass). The pulp may also be nanopulp comprised of nanocellulose fibers. Also combinations of said pulp types are possible in the context of the present invention. The pulp may also contain synthetic fibers or biofibers such as PLA (Poly-lactic acid). Said cellulose may be converted into a cellulose derivative. It is intended throughout the present description that the expression "cellulose derivate" embraces any type of fiber-forming cellulose derivate, in particular 1) cellulose carbamate, 2) cellulose ethers with low degree of substitution, in particular methyl (CMC) or ethyl cellulose (with substitution degree <0.2) also hydroxyl ethyl cellulose and hydroxyl propyl cellulose with molecular substitution of lower that 0.3, 3) cellulose allophanate and hemicellulose and/or mixtures thereof.

According to a further preferred embodiment of the first aspect of the invention said shaping in step d) involves a solvent extrusion step.

According to a further preferred embodiment of the first aspect of the invention said shaped body is a filament, non-woven fabric film or a membrane, preferably a filament, most preferred a filament yarn.

According to a further preferred embodiment of the first aspect of the invention said one or more salts in step e) are cations selected from the $1^{st}$, $2^{nd}$ or $3^{rd}$ main groups of the periodic table, preferably divalent cations such as $Ca^{2+}$ and $Mg^{2+}$.

According to a further preferred embodiment of the first aspect of the invention the concentration of said cations is in the range of from 0.01 mmol/l up to 1000 mmol/, preferably from 0.05 mmol/l to 1 mmol/l.

According to a further preferred embodiment of the first aspect of the invention the coagulation bath in step e) also contains additional additives, such as one or more acids or one or more alkaline media.

According to a further preferred embodiment of the first aspect of the invention the salts are washed out from the shaped body after the coagulation bath treatment in step e).

According to a further preferred embodiment of the first aspect of the invention the solvent extrusion in step d) is performed through a solution spinning or wet-spinning, preferably through air-gap spinning or dry jet-wet spinning. Said techniques are techniques known to a person skilled in the art.

According to a further preferred embodiment of the fourth aspect of the invention the stabilization is performed at a temperature from about 100 to about 450° C., preferably from about 200 to about 300° C., most preferred from about 220 to about 280° C. wherein the stabilization is done at a residence time of from 10 to 180 minutes, preferably from 20 to 80 minutes.

According to a further preferred embodiment of the sixth aspect of the invention the stretch-pre-carbonization is realized by stretching the stabilized fiber up to 10-fold at a temperature below 1300° C., preferably below 1100° C., most preferred below 1000° C.

According to a further preferred embodiment of the eighth aspect of the invention the carbonization is performed at a temperature from 900 to 2000° C., preferably from 1200 to 1800° C., most preferred in an inert gas such as nitrogen.

As said previously In PCT/2012EP/59114 a method for the production of lignin-containing precursor fibers and also carbon fibers based on the raw materials cellulose and lignin is described. Both components are dissolved together in an appropriate dissolving media to form the dope. The dope is then transferred through a spinning nozzle so that filaments are being formed. In air-gap spinning the nozzle is placed a few centimeters above the precipitation bath. The filament yarn is then fed into a precipitation bath containing deionized water as non-solvent to give lignin-containing precursor fibers.

In the following steps the endless filaments are washed intensively to remove residues of the solvent and dried to perform the structural collapse of the never-dried fiber. It was observed that the color of the solution in the precipitation bath, quickly turned from transparent to dark which can be owed to lignin diffusion from the never-dried filaments to the bath. In a next step the amount of leached lignin was determined by quantifying the amount of sulfur via elemental analysis using atomic absorption spectroscopy. Due to the fact that only the lignin contains sulfur, in contrast to the solvent and the cellulose, the amount of sulfur directly correlates with the amount of lignin. In this way the amount of lignin in the dope and the precursor, respectively could be quantified and the loss of lignin due to diffusion into the precipitation bath could be calculated. It was found that nearly half of the lignin in the spinning dope diffused into the spinning bath.

The present invention describes a method for minimizing the loss of lignin in the precipitation step during the solvent extrusion of a lignin containing dope to a shaped body such as filaments, non-woven fabrics films and membranes through the addition of certain salts into the precipitation bath. Surprisingly, lignin leaching was significantly reduced.

Preferred features of each aspect of the invention are as for each of the other aspects mutatis mutandis. The prior art document(s) mentioned herein are incorporated to the fullest extent permitted by law. The invention is further described in the following examples which do not limit the scope of the invention in any way. Embodiments of the present invention are described as mentioned in more detail with the aid of examples of embodiments the only purpose of which is to illustrate the invention and are in no way intended to limit its extent.

EXAMPLES

Example 1

An endless, continuous yarn consisting of 70 filaments and comprised of cellulose and lignin was produced according to the method described in patent publication WO2012156441A1. Specifically, 9.5 wt % cellulose and 9.5 wt % lignin were mixed with N-methylmorpholine-N-oxide hydrate and heated at 90° C. at 50 mbar until a NMMO content of at least 87% was attained and the dope was formed. In an air-gap spinning apparatus the dope was transferred to the spinning pump by a single screw-extruder. The throughput and drawing from the nozzle were adjusted so that total fineness of the final single-filament was 7-8 dtex. The dope was spun using a nozzle having 70 holes with diameters of 0.125 mm. A 40 mm air gap was realized between the nozzle and the coagulation bath. A constant air flow in the air gap was supplied to discharged dope. The multifilament was coagulated in the coagulation bath containing deionized water and passed through a washing bath filled with hot water followed by washing with distilled water using three Nelson Type rollers. The precursor was then dried at 120° C. in a 2-stage drying roll to obtain lignin-cellulose containing precursors. By elemental analysis (via sulphur content) a lignin content of 28% was determined in the precursor filament yarn.

Example 2

An endless, continuous yarn consisting of 70 filaments and comprised of cellulose and lignin was produced according to the method described in example 1 with the difference that a mixture of deionized water and 0.1 mmol/l $Ca^{2+}$ ($CaCl_2$) was used as precipitation media. By elemental analysis (via sulphur content) a lignin content of 43% was determined in the precursor filament yarn. This example demonstrates clearly that the diffusion of lignin in to the precipitation bath can be minimized through the addition of salt in to the bath.

Various embodiments of the present invention have been described above but a person skilled in the art realizes further minor alterations, which would fall into the scope of the present invention. The breadth and scope of the present invention should not be limited by any of the above-described exemplary embodiments, but should be defined only in accordance with the following claims and their equivalents. For example, any of the above-noted methods may be combined with other known methods. Other aspects, advantages and modifications within the scope of the invention will be apparent to those skilled in the art to which the invention pertains.

REFERENCES

[1] Kadla, J. F., et al. Carbon 40 (15), 2002, p. 2913-2920
[2] Kubo Y., et al., Carbon 36 (7-8), 1998, p. 1119-1124
[3] Sudo K., Shimizu K., J. Appl. Polymer Sci. 44 (1), 1992, p. 127-134
[4] Uraki, Y. et al., Holzforschung 49 (4), 1995, p. 343-350
[5] G. Husman, "Development and Commercialization of a Novel Low-Cost Carbon Fiber," Zoltek, http://energy.gov/sites/prod/files/2014/07/f17/lm048_husman_2014_o.pdf, 2014

The invention claimed is:

1. A method for manufacturing a shaped body comprising lignin, comprising the following steps:
   a) providing cellulose and/or a cellulose derivative,
   b) providing lignin and/or a lignin derivative,
   c) dissolution of said cellulose and/or a cellulose derivative, and lignin and/or a lignin derivative, followed by subsequent mixing thus providing a dope,
   d) performing a shaping of the dope to a precursor material,
   e) performing a coagulation of said precursor material in a bath containing a coagulation liquid, wherein the coagulation liquid comprises one or more salts, wherein said one or more salts have cations selected from the $1^{st}$, $2^{nd}$, or $3^{rd}$ main groups of the periodic table and
   f) drying of said precursor material, thus providing a shaped body comprising lignin.

2. A method for manufacturing a shaped body comprising lignin according to claim 1 wherein said shaping in step d) involves a solvent extrusion step.

3. A method for manufacturing a shaped body comprising lignin according to claim 1 wherein said shaped body is a filament, non-woven fabric film or a membrane.

4. A method for manufacturing a shaped body comprising lignin according to claim 1 wherein a concentration of said cations is in a range of from 0.01 mmol/l up to 1000 mmol/l.

5. A method for manufacturing a shaped body comprising lignin according to claim 1 wherein the coagulation bath in step e) also contains one or more acids.

6. A method for manufacturing a shaped body comprising lignin according to claim 1 wherein the salts are washed out from the shaped body after the coagulation bath treatment in step e).

7. A method according to claim 2 wherein the solvent extrusion in step d) is performed through a solution spinning or wet-spinning.

8. A method according to claim 1 comprising the following additional steps:
   g) forming the shaped body comprising lignin in the form of a filament, and
   h) performing a stabilization on the filament, thus providing a stabilized carbon fibre.

9. A method according to claim 8 wherein the stabilization is performed at a temperature from about 100 to about 450° C., wherein the stabilization is done at a residence time of from 10 to 180 minutes.

10. A method according to claim 8 comprising the following additional step:
    i) performing a stretch-pre-carbonization, thus providing a highly oriented intermediate carbon fiber.

11. The method according to claim 10 wherein the stretch-pre-carbonization is realized by stretching the stabilized fiber up to 10-fold at a temperature below 1300° C.

12. A method according to claim 8 comprising the following additional step:
    j) performing a carbonization step on the stabilized carbon fiber, thus providing a carbon fiber.

13. A method according to claim 12 wherein the carbonization is performed at a temperature from 900 to 2000° C.

14. A method for manufacturing a shaped body comprising lignin according to claim 1 wherein said shaped body is a filament.

15. A method for manufacturing a shaped body comprising lignin according to claim 1 wherein said shaped body is a filament yarn.

16. A method for manufacturing a shaped body comprising lignin according to claim 1 wherein said one or more salts in step e) are cations are divalent cations, namely $Ca^{2+}$ and $Mg^{2+}$.

17. A method for manufacturing a shaped body comprising lignin according to claim 1 wherein the concentration of said cations is in the range of from 0.05 mmol/l to 1 mmol/l.

18. A method for manufacturing a shaped body comprising lignin according to claim 1 wherein the coagulation bath in step e) also contains one or more alkaline media.

19. A method according to claim 2 wherein the solvent extrusion in step d) is performed through air-gap spinning or dry jet-wet spinning.

20. A method according to claim 8 wherein the stabilization is performed at a temperature from about 200 to about 300° C., wherein the stabilization is done at a residence time of from 10 to 180 minutes.

21. A method according to claim 8 wherein the stabilization is performed at a temperature from about 220 to about 280° C., wherein the stabilization is done at a residence time of from 10 to 180 minutes.

22. A method according to claim 8 wherein the stabilization is performed at a temperature from about 100 to about 450° C., wherein the stabilization is done at a residence time of from 20 to 80 minutes.

23. A method according to claim 8 wherein the stabilization is performed at a temperature from about 200 to about 300° C., wherein the stabilization is done at a residence time of from 20 to 80 minutes.

24. A method according to claim 8 wherein the stabilization is performed at a temperature from about 220 to about 280° C., wherein the stabilization is done at a residence time of from 20 to 80 minutes.

25. The method according to claim 10 wherein the stretch-pre-carbonization is realized by stretching the stabilized fiber up to 10-fold at a temperature below 1000° C.

26. The method according to claim 10 wherein the stretch-pre-carbonization is realized by stretching the stabilized fiber up to 10-fold at a temperature below 1100° C.

27. A method according to claim 10, further comprising the step:
   j) performing a carbonization step on the highly oriented intermediate carbon fiber, thus providing a carbon fiber.

28. A method according to claim 12 wherein the carbonization is performed at a temperature from 1200 to 1800° C.

29. A method according to claim 12 wherein the carbonization is performed in an inert gas.

\* \* \* \* \*